United States Patent Office 3,557,257
Patented Jan. 19, 1971

3,557,257
PHOSPHORIC, PHOSPHONIC, THIONO - PHOSPHORIC AND THIONO-PHOSPHONIC ACID ESTERS
Gerhard Schrader, Wuppertal-Cronenberg, and Wolfgang Behrenz, Cologne-Stammheim, Germany, assignors to Farbenfabriken Bayer Aktiengesellschaft, Leverkusen, Germany, a corporation of Germany
No Drawing. Filed Sept. 4, 1968, Ser. No. 758,189
Claims priority, application Germany, Sept. 9, 1967, 1,668,018
Int. Cl. A01n 9/36; C07f 9/08, 9/16
U.S. Cl. 260—940        10 Claims

ABSTRACT OF THE DISCLOSURE (Alkyl and O - alkyl) - O - alkyl - O - (4 - [(alkylmercapto-cyano)-methylmercapto] - phenyl) - phosphoric, phosphonic, thionophosphoric and thionophosphonic acid esters, i.e. (alkyl and O-alkyl)-O-alkyl-O-(4-[($\alpha$-alkylmercapto)-cyanomethylmercapto] - phenyl) - phosphoric, phosphonic, thionophosphoric and thionophosphonic acid esters which possess pesticidal, especially insecticidal, acaricidal, and nematicidal, properties and which may be produced by reacting the corresponding phosphoric (phosphonic) and thiono-phosphoric (phosphonic) acid ester halide with the appropriate 4-(alkylmercapto-cyano)-methylmercaptophenol compound.

---

The present invention relates to and has for its objects the provision for particular new phosphoric, phosphonic, thionophosphoric and thionophosphonic acid esters of 4-(alkylmercapto-cyano)-methylmercapto - phenols which possess pesticidal, especially insecticidal, acaricidal and nematicidal, properties, active compositions in the form of mixtures of such compounds with solid and liquid dispersible carrier vehicles, and methods for producing such compounds and for using such compounds in a new way especially for combating pests, e.g. arthropods and nematodes, with other and further objects becoming apparent from a study of the within specification and accompanying examples.

In German Pat. 1,192,202 there are described insecticidally effective (thiono)phosphoric or phosphonic or phosphinic acid 4-cyanomethylmercapto-phenyl esters which are obtainable by reaction of the appropriate (thiono)phosphoric or phosphonic or phosphinic acid halides with 4-cyanomethylmercapto-phenols.

It has been found in accordance with the present invention that the particular new phosphoric, phosphonic, thionophosphoric and thionophosphonic acid esters, i.e. of 4 - (alkylmercapto - cyano)-methylmercapto-phenols, having the formula

in which:

$R_1$ is selected from the group consisting of lower alkyl and lower alkoxy;
$R_2$ is lower alkyl, $R_1$ and $R_2$ being the same or different;
$R_3$ is lower alkyl; and
X is selected from the group consisting of oxygen and sulfur, exhibit strong pesticidal, especially insecticidal, acaricidal and nematicidal, properties.

The present invention furthermore provides a process for the production of esters of Formula I above in which a phosphoric, phosphonic, thiono-phosphoric or thiono-phosphonic acid ester halide of the general formula:

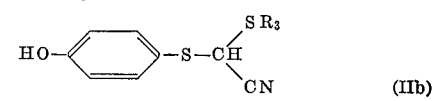

in which:

$R_1$, $R_2$ and X are the same as defined above, and
Hal is a halogen atom, preferably chloro or bromo, is reacted with a 4-(alkylmercapto - cyano) - methylmercapto-phenol of the general formula:

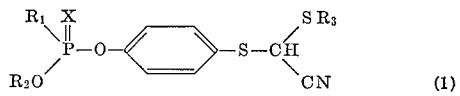

in which:

$R_3$ is the same as defined above, in the form of a salt or in the presence of an acid-binding agent.

Advantageously, the esters of the present invention are distinguished by an outstanding insecticidal, acaricidal and nematicidal activity. The instant compounds are in this respect clearly superior to known compounds of analogous constitution which have been suggested as pesticidally active compounds, and therefore the instant compounds represent a genuine enrichment of the art.

The course of the production reaction according to the present invention can be illustrated by the following reaction scheme:

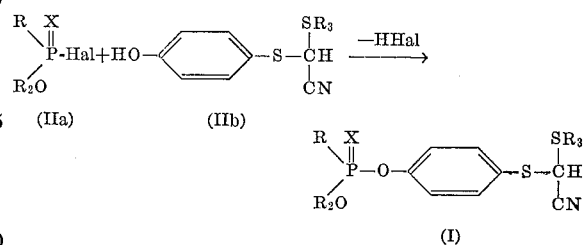

In Formulae IIa, IIb and I of such reaction scheme, the symbols $R_1$, $R_2$, $R_3$, X and Hal are the same as defined above.

Advantageously, in accordance with the present invention, in the various formulae herein:

$R_1$ represents:

straight and branched chain lower alkyl such as methyl to tert.-butyl inclusive, especially methyl, ethyl, n- and iso-propyl, n-, iso- and s-butyl, and the like, particularly alkyl having 1–4, and preferably 1–2, carbon atoms; or straight and branched chain lower alkoxy such as methoxy to tert.-butoxy inclusive, especially methoxy, ethoxy, n- and iso-propoxy, n-, iso- and s-butoxy, and the like, particularly alkoxy having 1–4, and preferably 1–2, carbon atoms;

$R_2$ represents:

straight and branched chain lower alkyl as defined above for $R_1$, particularly alkyl having 1–4, and preferably 1–2, carbon atoms, $R_2$ and $R_1$ being the same or different where $R_1$ is also lower alkyl;

$R_3$ represents:

straight and branched chain lower alkyl as defined above for $R_1$ and $R_2$, particularly alkyl having 1–4, preferably 1–3, carbon atoms, and most preferably methyl and isopropyl; and X represents:

oxygen or sulfur.

The compounds of the general Formula IIb which are required as starting materials for the process for producing the compounds of the invention are, in part, described in the literature. They can be prepared, even on an industrial scale, according to known methods by reaction of the appropriate α-halo-α-alkylmercapto-acetonitriles with thiohydroquinone in the presence of suitable acid acceptors as well as in the presence of the usual solvents, for example acetonitrile.

The acid ester halides of Formula IIa are well known.

The production reaction of the present invention is carried out preferably in the presence of a solvent (this term includes a mere diluent). Particularly good results have been obtained using low-boiling aliphatic ketones and nitriles, such as acetone, methylethyl ketone, methylisopropyl ketone, methylisobutyl ketone, acetonitrile and propionitrile, and also (optionally chlorinated) aromatic or aliphatic hydrocarbons, for example benzene, toluene, xylene, chlorobenzene, methylene chloride, chloroform, carbon tetrachloride, mono-, di- and tri-chloroethylene, etc. Finally, the reaction can—insofar as the reactivity of the (thiono)phosphoric or phosphonic acid ester halide concerned permits—also take place in water as solvent.

As already mentioned above, the reaction may be carried out with the use of an acid-binding agent. Particularly suitable acid-binding agents are alkali metal carbonates and alcoholates, such as potassium or sodium carbonate, methylate or ethylate, and also tertiary bases, for example triethylamine, diethylaniline or pyridine, and the like. Instead of working in the presence of an acid-binding agent, it is also possible to react the appropriate 4 - (alkylmercapto-cyano)-methylmercapto-phenolate as mentioned above; in this case alkali metal phenolates and alkaline earth metal phenolates are especially suitable.

The reaction may be carried out within a fairly wide temperature range. In general, it is effected at room temperature, or slightly to moderately elevated temperatures, preferably at substantially between about 20 to 70° C. Since, however, the reaction sometimes proceeds more or less strongly exothermically, it may in these cases be necessary, particularly at the beginning of the reaction, to cool the reaction mixture externally. Finally, it has proved expedient to continue stirring the reaction mixture (after combining the starting components) for a longer period (½ to 3 hours or overnight—optionally with slight heating) in order to complete the reaction.

As can be seen from the above reaction scheme, equimolar amounts of the starting materials are appropriate to the reaction. It has proved expedient to provide a solution or suspension of the phenolate concerned (or of a mixture of the appropriate phenol and a suitable acid-binding agent) in one of the above-mentioned solvents and to add the (thiono)phosphoric or phosphonic acid ester halide dropwise thereto at the aforesaid temperatures, with stirring. Working up of the mixture may take place in the usual manner by pouring out the mixture into water, taking up the reaction product (which separates in oily form) in one of the above-mentioned hydrocarbons, preferably benzene, washing and drying the organic phase, evaporating the solvent and, optionally, subsequently fractionally distilling the residue.

The esters of the present invention are in most cases colorless to slightly yellow-colored, water-insoluble oils which, even under greatly reduced pressure, cannot be distilled without decomposition; they can, however, be freed from the last volatile components by so-called "slight distillation," that is, by heating to slightly to moderately elevated temperatures in a vacuum, and in this way they can be purified.

As already mentioned above, the esters of the present invention possess an outstanding, rapidly-commencing and long-lasting insecticidal, acaricidal and nematicidal effectiveness, with in some cases extremely low toxicity to warm-blooded animals and concomitantly low phytotoxicity. The instant compounds are therefore usable with success as active compounds in plant protection and the protection of stored products, as well as in the hygiene field, for the control of noxious sucking and biting insects, Diptera and mites, as well as nematodes.

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi.*), the pea aphid (*Macrosiphum pisi*) and the potato aphid (*Macrosiphum solanifolii*), the currant gall aphid (*Cryptomyzus korschelti*), the mealy apple aphid (*Sappaphis mali*), the mealy plum aphid (*Hyalopterus arundinis*) and the cherry black-fly (*Myzus cerasi*); scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestants*), and cicadas, such as *Euscelis bilobatus* and *Nephotettix bipunctatus*; and the like.

In the case of the biting insects contemplated herein, above all there should be mentioned butterfly caterpillars (Lepidoptera) such as the diamond-back moth (*Plutella maculipennis*), the gipsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kuhniella*) and greater wax moth (*Gallera mellonella*); and the like.

Also to be classed with the biting insects contemplated herein are beetles (Coleoptera), for example the granary weevil (*Sitophilus granarius*-*Calandra granaria*), the Colorado beetle (*Leptinotarsa decemlineata*), the dock beetle (*Gastrophysa viridula*), the mustard beetle (*Phaedon cochleariae*), the blossom beetle (*Meligaethes aeneus*), the raspberry beetle (*Byturus tomentosus*), the bean weevil (*Bruchidius-Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the sawtoothed grain beetle (*Oryzaephilus surinamensis*), and also species living in the soil, for example wireworms (Agriotes spec.) and larvae of the cockchafer (*Melolontha melolontha*); cockroaches, such as the German cockrock (*Blattella germanica*), American cockroach (*Periplaneta americana*), Maderia cockroach (*Laucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta*; Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and blue-bottle fly (*Calliphora erythrocephala*) as well as the stable fly (*Stomoxys calcitrans*); gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) contemplated herein there are classed, in particular, the spider mites (Tetranychidae) such as the two-spotted spider mite (*Tetranychus telarius-Tetranychus althaeae* or *Tetranychus urticae*) and the European red mite (*Paratetranychus pilosus-Panonychus ulmi*), blister mites, for example the currant blister mite (*Eriophyes ribis*) and tarsonemids, for example the broad mite (*Hemitarsonemus latus*) and the cyclamen mite (*Tarsonemus pallidus*); and ticks, such as the relapsing fever tick (*Ornithodorus moubata*); and the like.

To the phytopathogenic nematodes contemplated herein there belong, in the main, leaf nematodes (Aphelenchoides), such as *Chrysanthemum foliar* nematodes (*A. ritzemabosi*), strawberry nematodes (*A. fragariae*) and rice nematodes (*A. oryzae*); stem nematodes (Ditylenchus), for example the stem nematode (*D. dipsaci*); root gall nematodes (Meloidogyne), such as *M. arenaria* and *M. incognita*; cyst-forming nematodes (Heterodera), such as golden nematode of potato (*H. rostochiensis*), and sugar beet nematode (*H. schachtii*); and free living root nematodes, for example of the genera Pratylenchus, Paratylenchus, Rotylenchus, Ziphinema and Radopholus; and the like.

The active compounds according to the instant invention can be utilized, if desired, in the form of the usual formulations or compositions with conventional pesticidal diluents or extenders, i.e. conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g., alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, insecticides, nematicides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001–20%, preferably 0.01–20%, and most preferably 0.01–5%, by weight of the mixture. Thus, the present invention contemplates over-all compositions which comprise mixtures of a conventional dispersible carrier vehicle such as (1) a dispersible carrier solid, and/or (2) a dispersible carrier liquid such as an inert organic solvent and/or water, preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.01–95%, by weight of the mixture.

The active compound can also be used in accordance with the well known ultra-low-volume process with good success, i.e. by applying such compound if normally a liquid, or by applying a liquid composition containing the same, via very effective atomizing equipment in extremely finely divided form, i.e. mist form, for example by airplane crop spraying techniques. Only a few liters/hectare are needed, and often amounts up to about 1 quart/acre, preferably 2–16 fluid ounces/acre, are sufficient. In this process it is possible to use highly concentrated liquid compositions with said liquid carrier vehicles containing from about 40 to about 95% by weight of the active compound or even the 100% active substance alone, e.g. about 40–100% by weight of the active compound.

Furthermore, the present invention contemplates methods of selectively controlling or combating pests, e.g. arthropods, i.e. insects and acarids, and nematodes, and more particularly, methods of combating or killing at least one of insects, acarids and/or nematodes which comprises applying to at least one of correspondingly (a) such insects, (b) such acarids, (c) such nematodes and (d) the corresponding habitat, i.e. the locus to be protected, a correspondingly combative or toxic amount, i.e. an arthropodicidally, especially insecticidally or acaricidally, or nematicidally, effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like.

It will be realized, of course, that the concentration of the particular active compound utilized in admixture with the carrier vehicle will depend upon the intended application. Therefore, in special cases it is possible to go above or below the aforementioned concentration ranges.

The outstanding activity of the particular new compounds of the present invention is illustrated without limitation by the following examples:

EXAMPLE 1

Mosquito larvae test

Test creatures: *Aedes aegypti* (5th larval stage)
Solvent: 99 parts by weight acetone
Emulsifier: 1 part by weight benzylhydroxydiphenylpolyglycol ether To produce a suitable preparation of the particular active compound, 2 parts by weight of such active compound are dissolved in 1000 parts by volume of the solvent containing the stated amount of emulsifier and the resulting concentrate is diluted with water to the desired final lower concentration.

The aqueous preparations of the given active compounds are placed in glass vessels and about 25 mosquito larvae are then placed in each glass vessel.

After 24 hours, the degree of destruction is determined as a percentage. 100% means that all the larvae are killed. 0% means that no larvae at all are killed.

The particular active compounds tested, their concentrations and the results obtained can be seen from the following Table 1.

pound is mixed with the stated amount of solvent containing the stated amount of emulsifier, and the resulting concentrate is diluted with water to the desired final concentration.

Cabbage leaves (*Brassica oleracea*) are sprayed with the given preparation of the active compound until dripping wet and then infested with mustard beetle larvae (*Phaedon cochleariae*).

TABLE 1.—MOSQUITO LARVAE TEST

| Active compound, constitution | Concentration of active compound in the solution in percent | Degree of destruction in percent |
|---|---|---|
| Compounds according to the invention: | | |
| ($1_1$) $(C_2H_5O)_2\overset{S}{\overset{\|}{P}}-O-\langle\text{phenyl}\rangle-S-CH(SCH_3)(CN)$ | 0.000001<br>0.0000001 | 100<br>90 |
| ($2_1$) $(CH_3O)_2\overset{S}{\overset{\|}{P}}-O-\langle\text{phenyl}\rangle-S-CH(CN)(S-C_3H_7\text{iso})$ | 0.0000001<br>0.00000001 | 100<br>90 |
| ($3_1$) $(CH_3O)_2\overset{S}{\overset{\|}{P}}-O-\langle\text{phenyl}\rangle-S-CH(SCH_3)(CN)$ | 0.000001<br>0.0000001 | 100<br>50 |
| ($4_1$) $(C_2H_5O)_2\overset{S}{\overset{\|}{P}}-O-\langle\text{phenyl}\rangle-S-CH(CN)(SC_3H_7\text{iso})$ | 0.000001 | 100 |
| ($5_1$) $\underset{C_2H_5O}{\overset{C_2H_5}{>}}\overset{S}{\overset{\|}{P}}-O-\langle\text{phenyl}\rangle-S-CH(CN)(SC_3H_7\text{iso})$ | 0.000001<br>0.0000001 | 100<br>90 |
| Known comparative compounds: | | |
| (A) $(C_2H_5O)_2\overset{O}{\overset{\|}{P}}-O-\langle\text{phenyl}\rangle-S-CH_2-CN$ | 0.0001<br>0.00001 | 100<br>90 |
| (B) $\underset{C_2H_5}{\overset{C_2H_5O}{>}}\overset{S}{\overset{\|}{P}}-O-\langle\text{phenyl}\rangle-S-CH_2-CN$ | 0.00001<br>0.000001 | 100<br>90 |
| (C) $\underset{CH_3}{\overset{C_2H_5O}{>}}\overset{S}{\overset{\|}{P}}-O-\langle\text{phenyl}\rangle-S-CH_2-CN$ | 0.0001<br>0.000001 | 100<br>30 |
| (D) $(CH_3)_2\overset{S}{\overset{\|}{P}}-O-\langle\text{phenyl}\rangle-S-CH_2-CN$ | 0.0001<br>0.00001 | 100<br>40 |
| (E) $\underset{C_2H_5O}{\overset{(CH_3)_2N}{>}}\overset{S}{\overset{\|}{P}}-O-\langle\text{phenyl}\rangle-S-CH_2-CN$ | 0.01<br>0.001 | 100<br>0 |
| (F) $\underset{(CH_3)_2N}{\overset{(CH_3)_2N}{>}}\overset{O}{\overset{\|}{P}}-O-\langle\text{phenyl}\rangle-S-CH_2-CN$ | 0.001<br>0.0001 | 100<br>0 |

EXAMPLE 2

Phaedon larvae test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

After the period of time stated in the following table, the degree of destruction of the pests is determined and expressed as a percentage: 100% means that all, and 0% means that none, of the beetle larvae are killed.

The particular active compounds tested, their concentrations, the evaluation time and the experimental results obtained can be seen from the following Table 2.

TABLE 2.—PHAEDON LARVAE TEST

| Active compound, constitution | | Concentration of active compound in percent | Degree of destruction in percent after 3 days |
|---|---|---|---|
| (6₁) | $(C_2H_5O)_2\overset{O}{\overset{\|}{P}}-O-\underset{}{\langle\phantom{X}\rangle}-S-\underset{SCH_3}{\overset{CN}{\underset{\|}{C}H}}$ | 0.1<br>0.01<br>0.001 | 100<br>100<br>100 |
| (7₁) | $(C_2H_5O)_2\overset{O}{\overset{\|}{P}}-O-\underset{}{\langle\phantom{X}\rangle}-S-\underset{SC_3H_7\text{iso}}{\overset{CN}{\underset{\|}{C}H}}$ | 0.1<br>0.01 | 100<br>100 |
| (3₂) | $(CH_3O)_2\overset{S}{\overset{\|}{P}}-O-\underset{}{\langle\phantom{X}\rangle}-S-\underset{SCH_3}{\overset{CN}{\underset{\|}{C}H}}$ | 0.1<br>0.01 | 100<br>60 |
| (2₂) | $(CH_3O)_2\overset{S}{\overset{\|}{P}}-O-\underset{}{\langle\phantom{X}\rangle}-S-\underset{SC_3H_7\text{iso}}{\overset{CN}{\underset{\|}{C}H}}$ | 0.1 | 100 |
| (1₂) | $(C_2H_5O)_2\overset{S}{\overset{\|}{P}}-O-\underset{}{\langle\phantom{X}\rangle}-S-\underset{SCH_3}{\overset{CN}{\underset{\|}{C}H}}$ | 0.1<br>0.01 | 100<br>75 |
| (4₂) | $(C_2H_5O)_2\overset{S}{\overset{\|}{P}}-O-\underset{}{\langle\phantom{X}\rangle}-S-\underset{SC_3H_7\text{iso}}{\overset{CN}{\underset{\|}{C}H}}$ | 0.1<br>0.01 | 100<br>80 |
| (8₁) | $\underset{C_2H_5O}{\overset{C_2H_5}{\diagdown}}\overset{S}{\overset{\|}{P}}-O-\underset{}{\langle\phantom{X}\rangle}-S-\underset{SCH_3}{\overset{CN}{\underset{\|}{C}H}}$ | 0.1<br>0.01 | 100<br>90 |
| (5₂) | $\underset{C_2H_5O}{\overset{C_2H_5}{\diagdown}}\overset{S}{\overset{\|}{P}}-O-\underset{}{\langle\phantom{X}\rangle}-S-\underset{SC_3H_7\text{iso}}{\overset{CN}{\underset{\|}{C}H}}$ | 0.1<br>0.01 | 100<br>50 |

EXAMPLE 3

Critical concentration test

Test nematode: *Meloidogyne incognita*
Solvent: 40 parts by weight dimethyl formamide
Emulsifier: 10 parts by weight alkylaryl polyglycol ether To produce a suitable preparation of the particular active compound, 1 part by weight of such active compound is mixed with the stated amount of solvent, the stated amount of emulsifier is then added, and the resulting concentrate is diluted with water to the desired final concentration.

The preparation of the given active compound is intimately mixed with soil which is heavily infested with the test nematodes. The concentration of the active compound in the preparation is of practically no importance; only the amount of active compound per unit volume of soil (which is given in parts per million) is decisive. The soil is filled into pots, lettuce is sown in and the pots are kept at a greenhouse temperature of 27° C. After 4 weeks, the lettuce roots are examined for infestation with nematodes, and the degree of effectiveness of the given active compound is determined as a percentage. The degree of effectiveness is 100% when infestation is completely avoided; it is 0% when the infestation is exactly the same as in the case of the control plants in untreated soil which has been infested in the same manner.

The particular active compound tested, the amounts applied and the results obtained can be seen from the following Table 3.

TABLE 3.—CRITICAL CONCENTRATION TEST

| Active compound, constitution | | Degree of effectiveness in percent with amounts applied of p.p.m. | | |
|---|---|---|---|---|
| | | 50 | 40 | 20 |
| (6₂) | $(C_2H_5O)_2\overset{O}{\overset{\|}{P}}-O-\langle\phantom{X}\rangle-S-\underset{\diagdown CN}{\overset{\diagup SCH_3}{C}H}$ | 93 | 25 | 0 |

The following further examples illustrate, without limitation, the process for producing the new compounds of the present invention.

EXAMPLE 4

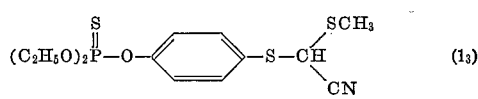

(1₃)

(0.4 molar mixture).

85 g. 4 - (methylmercapto - cyano) - methylmercaptophenol and 64 g. potassium carbonate are suspended in 300 ml. acetonitrile and to this suspension there are added dropwise, at 40 to 50° C., 76 g. O,O-diethyl-thionophosphoric acid ester chloride. The mixture is subsequently stirred at 50 to 60° C. for 3 hours, then the insoluble portion is filtered off with suction, the filtrate is washed with water and taken up in benzene, the benzene solution is washed until there is a neutral reaction, dried, and, after evaporation of the solvent, the residue is slightly distilled. Yield: 104 g. (72% of the theory) of O,O-diethyl - O - (4 - [(methylmercapto - cyano) - methylmercapto]-phenyl)-thionophosphoric acid ester.

*Analysis.*—Calcd. for $C_{13}H_{18}NO_3PS_3$ (molecular weight 363) (percent): P, 8.6; S, 26.4; N, 3.8. Found (percent): P, 8.88; S, 26.31; N, 3.44.

In analogous manner, the following compounds can be prepared:

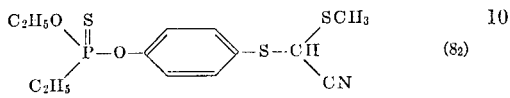 (8₂)

Yield: 108 g. (78% of the theory) of ethyl-O-ethyl-O-(4-[(methylmercapto - cyano) - methylmercapto]-phenyl)-thionophosphonic acid ester.

*Analysis.*—Calcd. for $C_{13}H_{18}NO_2PS_3$ (molecular weight 347) (percent): N, 4.0; P, 9.0. Found (percent): N, 3.57; P, 9.84.

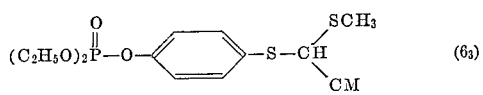 (6₃)

Yield: 135 g. (78% of the theory) of O,O-diethyl-O-(4-[(methylmercapto - cyano) - methylmercapto] - phenyl)-phosphoric acid ester.

*Analysis.*—Calcd. for $C_{13}H_{18}NO_4PS_2$ (molecular weight 347) (percent): N, 4.0; P, 9.0. Found (percent): N, 3.67; P, 9.47.

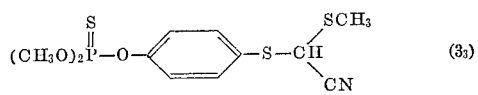 (3₃)

Yield: 95 g. (71% of the theory) of O,O-dimethyl-O-(4-[(methylmercapto - cyano) - methylmercapto] - phenyl)-thionophosphoric acid ester.

*Analysis.*—Calcd. for $C_{11}H_{14}NO_3PS_3$ (molecular weight 335) (percent): S, 28.6; P, 9.3. Found (percent): S, 28.23; P, 9.4.

The 4-(methylmercapto-cyano)-methylmercapto-phenol serving as starting material can be prepared for example as follows:

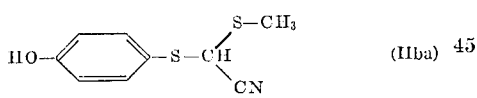 (IIba)

(1 molar mixture).

To a suspension of 126 g. thiohydroquinone and 140 g. potassium carbonate in 500 cc. acetonitrile there are added, at 25 to 30° C., 122 g. α-chloro-α-methylmercapto-acetonitrile. After subsequent stirring of the mixture for 2 hours, the latter is poured into water, taken up with benzene, the benzene solution is washed until there is a neutral reaction, dried, and, after evaporation of the solvent, the residue is slightly distilled.

The yield is 184 g. (87% of the theory).

*Analysis.*—Calcd. for $C_9H_9NOS_2$ (molecular weight 211): N, 6.7%. Found: N, 7.02%.

EXAMPLE 5

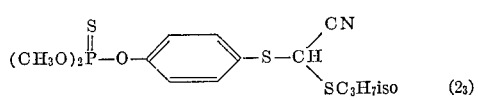 (2₃)

(0.4 molar mixture).

96 g. 4-(isopropylmercapto-cyano)-methylmercapto-phenol and 64 g. potassium carbonate are suspended in 400 cc. acetonitrile. To this suspension are added 65 g. O,O-dimethyl-thionophosphoric acid ester chloride at 20 to 40° C. The reaction mixture is subsequently heated to 60° C. for 3 hours, then poured into water, taken up with benzene, the benzene solution is washed until it reacts neutral, then dried, the solvent is evaporated and the residue is slightly distilled. Yield: 116 g. (80% of the theory) of O,O-dimethyl-O-(4-[(isopropylmercapto-cyano)-methylmercapto]-phenyl)-thionophosphoric acid ester.

*Analysis.*—Calcd. for $C_{13}H_{18}NO_3PS_3$ (molecular weight 363): P, 8.5%; S, 26.5%; N, 3.9%. Found: P, 8.3%; S, 27.0%; N, 3.7%.

In analogous manner, the following compounds can be prepared:

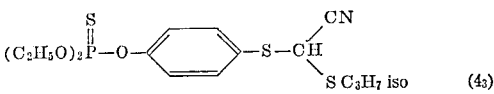 (4₃)

Yield: 138 g. (86% of the theory) of O,O-diethyl-O-(4-[(isopropylmercapto-cyano) - methylmercapto]-phenyl)-thionophosphoric acid ester.

*Analysis.*—Calcd. for $C_{15}H_{22}NO_3PS_3$ (molecular weight 391): P, 7.9%; S, 24.5%; N, 3.6%. Found: P, 8.3%; S, 24.3%; N, 3.4%.

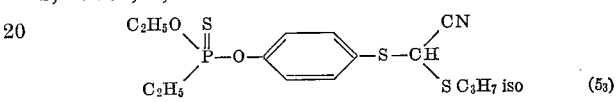 (5₃)

Yield: 108 g. (72% of the theory) of ethyl-O-ethyl-O-(4-[(isopropylmercapto-cyano) - methylmercapto]-phenyl)-thionophosphonic acid ester.

*Analysis.*—Calcd. for $C_{15}H_{22}NO_2PS_3$ (molecular weight 375): P, 8.3%; S, 25.6%; N, 3.7%. Found: P, 9.2%; S, 25.6%; N, 3.4%.

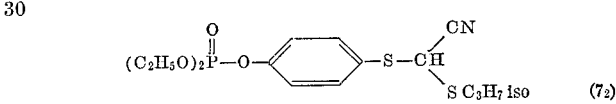 (7₂)

Yield: 129 g. (86% of the theory) of O,O-diethyl-O-(4 - [(isopropylmercapto - cyano) - methylmercapto]-phenyl)-phosphoric acid ester.

*Analysis.*—Calcd. for $C_{15}H_{22}NO_4PS_2$ (molecular weight 375): P, 8.3%; S, 17.1%; N, 3.7%. Found: P, 8.8%; S, 16.9%; N, 3.5%.

The 4-(isopropylmercapto - cyano) - methylmercapto-phenol to be used as starting material can be obtained for example as follows:

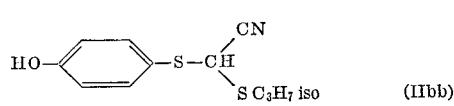 (IIbb)

(0.5 molar mixture).

0.5 mol sodium methylate is added to a solution of 63 g. thiohydroquinone in 300 cc. acetonitrile. 75 g. α-chloro-α-isopropylmercapto - acetonitrile dissolved in 50 cc. acetonitrile are then added dropwise, at 15 to 20° C., to the reaction mixture. After the mixture has been stirred for two hours, the latter is poured into water, taken up in benzene, the benzene solution is washed until there is a neutral reaction, dried, and the residue, after removal of the solvent, is slightly distilled.

The yield is 92 g. (77% of the theory).

*Analysis.*—Calcd. for $C_{11}H_{13}NOS_2$ (molecular weight 239): S, 26.8%; N, 5.9%. Found: S, 27.2%; N, 5.9%.

It will be realized that all of the foregoing compounds contemplated by the present invention possess the desired selective pesticidal, especially arthropodicidal, i.e. insecticidal or acaricidal, as well as nematicidal, properties for combating insects, acarids and nematodes, and that such compounds have not only a comparatively slight toxicity toward warm-blooded creatures, but also a concomitantly low phytotoxicity.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Phosphorus-acid ester of the formula:

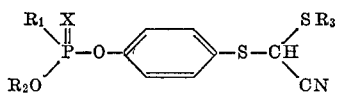

in which $R_1$ is selected from the group consisting of lower alkyl and lower alkoxy, $R_2$ is lower alkyl, $R_3$ is lower alkyl, and X is selected from the group consisting of oxygen and sulfur.

2. Ester according to claim 1 wherein $R_1$ is selected from the group consisting of $C_{1-4}$ alkyl and $C_{1-4}$ alkoxy, $R_2$ is $C_{1-4}$ alkyl, $R_3$ is $C_{1-4}$ alkyl, and X is selected from the group consisting of oxygen and sulfur.

3. Ester according to claim 1 wherein $R_1$ is selected from the group consisting of $C_{1-4}$ alkyl and $C_{1-4}$ alkoxy, $R_2$ is $C_{1-4}$ alkyl, $R_3$ is $C_{1-4}$ alkyl, and X is sulfur.

4. Ester according to claim 1 wherein $R_1$ is $C_{1-4}$ alkoxy, $R_2$ is $C_{1-4}$ alkyl, $R_3$ is $C_{1-4}$ alkyl, and X is oxygen.

5. Ester according to claim 1 wherein such compound is O,O-diethyl-O-(4-[methylmercapto-cyano) - methylmercapto]-phenyl)-thionophosphoric acid ester of the formula

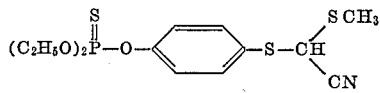

6. Ester according to claim 1 wherein such compound is O,O-dimethyl-O-(4-[(isopropylmercapto-cyano) - methylmercapto]-phenyl)-thionophosphoric acid ester of the formula:

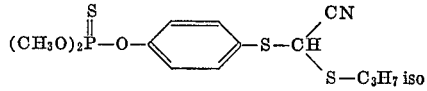

7. Ester according to claim 1 wherein such compound is ethyl-O-ethyl-O-(4-[(isopropylmercapto-cyano)-methylmercapto]-phenyl)-thionophosphonic acid ester of the formula:

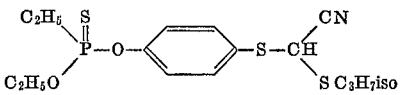

8. Ester according to claim 1 wherein such compound is O,O-diethyl-O-(4-[(methylmercapto-cyano) - methylmercapto]-phenyl)-phosphoric acid ester of the formula:

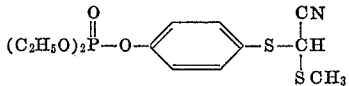

9. Ester according to claim 1 wheren such compound is O,O-diethyl-O-(4-[(isopropylmercapto-cyano)-methylmercapto]-phenyl)-phosphoric acid ester of the formula:

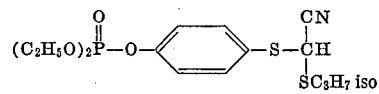

10. Ester according to claim 1 wherein such compound is ethyl-O-ethyl-O-(4-[(methylmercapto-cyano) - methylmercapto]-phenyl)-thionophosphonic acid ester of the formula:

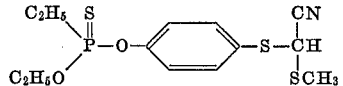

References Cited

UNITED STATES PATENTS 3,299,188   1/1967   Schicke _____ 260—940

CHARLES B. PARKER, Primary Examiner

A. H. SUTTO, Assistant Examiner

U.S. Cl. X.R.

260—465, 973; 424—210

UNITED STATES PATENT OFFICE
CERTIFICATE OF CORRECTION

Patent No. 3,557,257          Dated January 19, 1971

Inventor(s) Gerhard Schrader and Wolfgang Behrenz

It is certified that error appears in the above-identified patent and that said Letters Patent are hereby corrected as shown below:

Col. 2, line 31 - Formula (IIa)  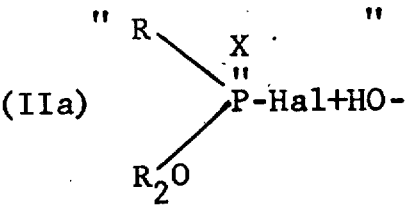

should be

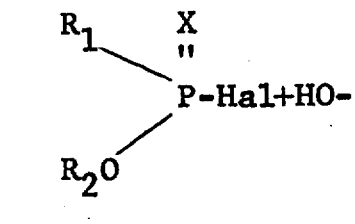

Col. 2, line 35 - Formula (I)  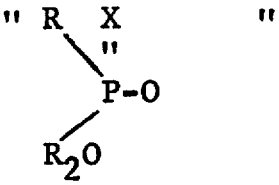

should be

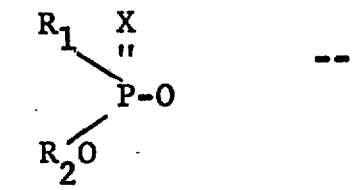

UNITED STATES PATENT OFFICE
CERTIFICATE OF CORRECTION

PO-1050 (5/69)

Patent No. 3,557,257  Dated January 19, 1971

Inventor(s) Gerhard Schrader and Wolfgang Behrenz

It is certified that error appears in the above-identified patent and that said Letters Patent are hereby corrected as shown below:

PAGE - 2

Col. 4, lines 54 and 55

"cockrock" should be -- cockroach --

Col. 7, Table

Third formula $\begin{smallmatrix} "S" \\ | \\ P \end{smallmatrix}$ should be -- $\begin{smallmatrix} S \\ " \\ P \end{smallmatrix}$ --

Signed and sealed this 8th day of June 1971.

(SEAL)
Attest:

EDWARD M. FLETCHER, JR.
Attesting Officer

WILLIAM E. SCHUYLER,
Commissioner of Pater